US005720025A

United States Patent [19]
Wilkes et al.

[11] Patent Number: 5,720,025
[45] Date of Patent: Feb. 17, 1998

[54] FREQUENTLY-REDUNDANT ARRAY OF INDEPENDENT DISKS

[75] Inventors: Andrew John Wilkes, Palo Alto, Calif.; Stefan Savage, Seattle, Wash.

[73] Assignee: Hewlett-Packard Company, Palo Alto, Calif.

[21] Appl. No.: 588,140

[22] Filed: Jan. 18, 1996

[51] Int. Cl.[6] .................................................. G06F 11/14
[52] U.S. Cl. .......................... 395/182.04; 395/441
[58] Field of Search ....................... 395/182.04, 182.05, 395/441

[56] References Cited

U.S. PATENT DOCUMENTS

| | | | |
|---|---|---|---|
| 5,274,799 | 12/1993 | Brant et al. | 395/575 |
| 5,315,602 | 5/1994 | Noya et al. | 371/40.4 |
| 5,333,305 | 7/1994 | Neufeld | 395/575 |
| 5,388,108 | 2/1995 | DeMoss et al. | 371/51.1 |
| 5,408,644 | 4/1995 | Schneider et al. | 395/575 |
| 5,418,925 | 5/1995 | DeMoss et al. | 395/425 |
| 5,463,765 | 10/1995 | Kakuto et al. | 395/441 |
| 5,497,457 | 3/1996 | Ford | 395/182.04 |
| 5,515,500 | 5/1996 | Mizuno et al. | 395/182.05 |
| 5,517,632 | 5/1996 | Matsumoto et al. | 395/441 |
| 5,522,032 | 5/1996 | Franaszek et al. | 395/182.04 |
| 5,537,534 | 7/1996 | Voight et al. | 395/182.04 |
| 5,559,764 | 9/1996 | Chen et al. | 369/30 |
| 5,572,661 | 11/1996 | Jacobson | 395/182.05 |
| 5,657,468 | 8/1997 | Stallmo et al. | 395/441 |

OTHER PUBLICATIONS

Gibson et al., "Failure Correction Techniques for Large Disk Arrays", 1989, pp. 123–132, Association for Computing Machinery.

Cormen et al., "Integrating Theory and Practice in Parallel File Systems," *Proceedings of the DAGS '93 Symposium*, Jun. 21–23, 1993, pp. 64–74.

Stodosky et al. "Parity Logging: Overcoming the Small Write Problem in Redundant Disk Arrays," *Proceedings 20th International Symposium on Computer Architecture*, May 16–19, 1993, pp. 64–75.

Menon et al., "Methods for Improved Update Performance of Disk Arrays," IBM report RJ 6928 (66034), Jul. 13, 1989.

*Primary Examiner*—Robert W. Beausoliel, Jr.
*Assistant Examiner*—Scott T. Baderman

[57] ABSTRACT

There is provided a method and apparatus for effectuating data updates on a fault-tolerant storage device having a plurality of disk-drive units forming a disk array, with parity-block updates temporarily suspended to provide increased performance. Parity-block updates are typically deferred until the array is idle. Thus, data is written onto the array with no parity error correction information being present for a short amount of time. Data updates are effectuated by identifying the blocks in the array where data is to be written. New data is then written directly to the identified blocks without reading the old data present therein. A "needs parity rebuild bit" (NPRB) is written to non-volatile memory, identifying the stripes not having parity information on the array. The number of NPRBs present is monitored to allow continuous calculation of a mean-time-to-data-loss (MTTDL). If the MTTDL is acceptable, parity updates are deferred until the array is idle. To that end, the I/O patterns to and from the array are monitored to determine idleness. If the I/O patterns indicate that the disk array is idle, new data is read and parity information is generated which is then written to the array.

18 Claims, 4 Drawing Sheets

FREQUENTLY-REDUNDANT ARRAY OF INDEPENDENT DISKS

TECHNICAL FIELD

The invention pertains to the field of data storage systems for computers. Specifically, the invention pertains to fault-tolerant storage architecture particularly suited for Redundant Arrays of Independent Disks (RAID).

BACKGROUND ART

In the computer industry, currently available personal computers have capabilities that exceed the capabilities of larger and more expensive mainframe and minicomputers of ten years ago. This enhanced performance is partly attributable to increased bus sizes and higher speed microprocessors. One factor in the endeavor to increase the performance of computers is shortening the data transfer time between high-capacity non-volatile storage devices and the microprocessors without a corresponding susceptibility to data loss.

Originally, high performance and high capacity storage devices employed a single large expensive disk (SLED). A SLED had a typical form factor in the range of 12 to 14 inches, and proved highly susceptible to data loss. For example, if the SLED failed, the information stored on it would no longer be available to the computer.

To overcome the drawbacks of the SLED, a RAID (Redundant Arrays of Independent Disks) architecture was developed. The RAID architecture includes an array of standard disks "ganged" together with data transferred to or from these disks in parallel.

One of the RAID architectures, RAID 5, employs a parity error correction technique to provide redundant information, thereby preventing data loss in the presence of a disk failure. In the RAID 5 architecture, N+1 disks in a set (also known as a redundancy group) are divided into a plurality of equally sized address areas, referred to as blocks. Each disk generally contains the same number of blocks. Blocks of each disk in a redundancy group having the same disk address ranges are referred to as "stripes." Each stripe has N blocks of data, plus one parity block on one disk containing parity information for the remainder of the stripe. The parity information prevents data loss in the event of a disk failure. Each array has a plurality of stripes and a plurality of parity blocks corresponding thereto, with parity data for the plurality of stripes typically stored on differing disks forming the array.

A drawback with RAID 5 is that, to maintain current parity information, data updates require a Read-Modify-Write (RMW) update protocol, necessitating a plurality of I/O requests. An RMW update protocol requires reading old parity and data blocks and XOR'ing these blocks with the new data. Both the new data and the parity blocks must then be written to the array. This results in a substantially longer rotational latency time than a SLED, because a SLED does not require the preliminary Read operations. The preliminary reading of the old data requires a wait period before performing the Write operation to afford the time necessary for the disk to rotate back to the proper position. The wait period is particularly troublesome when writing a number of small-files/partial-stripe updates. This is known as the small-update-problem. As the rotational latency time can amount to about 50% of the time required for a typical RMW, a plurality of partial stripe updates can result in a significant amount of access time.

A number of prior art attempts have been made to overcome the small-update-problem. Stodosky et al. in "Parity logging: overcoming the small write problem in redundant disk arrays," *Proceedings 20th International Symposium on Computer Architecture*, May 16–19 1993, pages 64–75, discuss a modified RMW update protocol. Stodosky et al. disclose performing the read old data and parity procedure, but delays parity updating by sending the XOR of the old data and parity to a log. At a later time, the log file is read against the array, and the parity is updated in situ. A problem with Stodosky et al.'s proposal is that it is overly complex.

Jai Menon and Jim Kasson describe a floating parity scheme in "Methods for improved update performance of disk arrays", IBM report RJ 6928 (66034), Jul. 13, 1989. The floating parity scheme performs a standard RMW sequence. However, in contrast to waiting until a full revolution of the disk occurs, the updated data and parity are immediately written to the array at the closest available space. Menon and Kasson's proposal introduces undue complexity by necessitating extra mapping pointers and knowledge of the rotational position of the data on the disks.

Thomas H. Cormen and David Kotz describe in "Integrating Theory and Practice in Parallel File Systems," *Proceedings of the 193 DAGS/PC Symposium*, pages 64–74, June 1993, selectively writing files to an array without parity protection. The files which are written without parity protection are those that have a relatively temporary status with respect to other files on the array. To allow recovery from disk failure, a paritypoint procedure is discussed, which is considered analogous to a checkpoint. The paritypoint is the point at which the program would restart operations should a disk fail, i.e., where the last recorded redundant information is stored on the array. A problem with this architecture is the need for explicit application and file system involvement which may result in long periods during which data is unprotected.

U.S. Pat. No. 5,274,799 to Brant et al. discloses a storage device with a copyback cache including a CPU coupled by a bus to an array controller, typically a fault-tolerant controller. The array controller is coupled to each of a plurality of storage units, i.e. disk drives, by an I/O bus. A non-volatile storage device, referred to as a copyback cache, is also coupled to the I/O bus. A mirrored copyback cache may also be provided so that any information written to the copyback cache is simultaneously written to the mirror copyback cache. When a Write occurs to the RAID, the data is immediately written to the first available location in the copyback cache. Upon completion of the Write to the copyback cache, the CPU is immediately informed that the Write was successful. Thereafter, further storage unit accesses by the CPU may continue without waiting for an error-correction block update for the data just written. In one embodiment, an error correction block is computed for each data block present in the copyback cache during the idle time by performing the conventional RMW update protocol. In a second embodiment, after Write data is logged to the copyback cache, Write operations to the array continues in overlapped fashion with other CPU I/O accesses, using Write data in the controller's buffer memory. In this fashion, the copyback cache functions more as a running "log" of Write data. A disadvantage with this device is the relatively small size of the "log", which limits the amount of data that may have updates delayed.

U.S. Pat. No. 5,315,602 to Noya et al. discloses a computer system with optimized stripe detection for a redundant array of disk drives comprising a host central processor having temporary data storage and a permanent storage, such as a disk system. A communication bus connects the central processor with the permanent storage. A cache memory is also connected to the communication bus. To reduce the number of I/O requests to transfer data between the host processor and the disk drives, the data frequently used by the processor is maintained in the cache. All new data is written to the cache before being written to the array. Typically, the cache is non-volatile, thereby protecting the data stored therein from loss due to power failures. To further reduce the number of I/O requests necessitated by the computer, a technique is employed that reduces the number of I/O requests required to produce parity data. A first procedure determines the number of I/O requests necessary to generate parity data from an entire stripe, including new data to be written to the array. A second procedure determines the number of I/O requests necessary to generate parity data from the new data and old parity data of the stripe. The system then aggregates, in the cache, the blocks necessary to generate the parity data as either an entire stripe or as individual blocks using the technique which requires the least number of I/O requests, as determined by the first or second procedure.

U.S. Pat. No. 5,418,925 to DeMoss et al. discloses a fast write handling in a disk array using a spare drive for buffering that includes a disk array controller. The controller is electronically coupled to a host computer system through a Host Interface. The controller is electronically coupled to coordinate the operation of an array of disk drives, including a spare drive. The spare drive is a fast-write-drive (FWD). Under direction of the controller, each data block to be written to the disk array is immediately routed to the FWD. The controller maintains a status table indicating that the current status of each FWD data track. Following completion of each block-write to a FWD data track, the controller updates the status table and saves the updated table to a volatile memory. The host system is then notified that the write steps are completed, leaving the host free to proceed with other operations while the controller independently completes write operations. To update data on one of the drives of the array, old data and parity information are first read from the array. The old data and parity information are XOR'd together. New data, previously saved to the FWD, is read and XOR'd with the old data and parity information that was previously XOR'd. A disadvantage with this architecture is the additional Read operations necessitated to read old parity information and data. Also, the reads to data on the FWD reduces the performance of DeMoss et al.'s architecture.

U.S. Pat. No. 5,388,108 to DeMoss et al. discloses a method for updating data and parity information in a disk array employing a read-modify-write (RMW) update protocol. Described in conjunction with a controller for a RAID 5 disk array, the method includes queuing proper Read and Write requests into the I/O queues upon completion of receipt of new data from a host system. The I/O operations are scheduled such that the controller first reads old data from the data drive and writes new and old data to first and second areas, respectively, within a storage buffer. The controller then writes new data to the data drive and performs parity operations, i.e. reading old parity information from the parity drive and saving the old parity information to a third area within the storage buffer. Generating the new parity information and writing the same to the parity drive is delayed until the appropriate drive is available to receive the information. In this manner, the parity drive may be used for other input/output operations until such time as the parity read, generate and write operations can proceed efficiently without inducing disk service time penalties. A disadvantage with this method is the limited size of the buffer, which reduces the amount of data that may be updated.

U.S. Pat. No. 5,333,305 to Neufeld discloses a method for improving partial-stripe-write-performance in disk array subsystems including the steps of determining both whether a partial stripe write operation has begun and whether a portion of the respective stripe that will not receive new data, during the partial stripe write, comprises unused space in the file system. If no unused space is preserved in the stripe, the partial stripe Write operation is performed using the conventional Read-Modify-Write (RMW) update protocol. If the portion of the respective stripe that will not receive new data during the partial stripe write comprises unused space in the file system, then the current contents of the data stripe do not need to be preserved. This method is only beneficial for use with a system in which the file system has a great amount of unused file space.

U.S. Pat. No. 5,408,644 to Schneider et al. discloses a method and apparatus for improving the performance of a partial-stripe-operation in a disk array subsystem. The subsystem includes a posting memory electronically coupled to both a disk array and a disk array controller. When a write operation to the disk array is performed, e.g. by a host processor, write data is written into the posting memory, provided space is available. The posting memory immediately returns a ready signal to the host. The conventional RMW update protocol occurs at a later time for each block of data in the posting memory. Due to seek delays and rotation latency of the disk array system, the storage time of data in the posting memory is much quicker than would be in the storage disk array system, enabling the host to continue other operations. A disadvantage with the Schneider et al. apparatus concerns the size of the posting buffer, which limits the amount of data that may be updated.

A drawback with most of the aforementioned attempts to overcome the small-update-problem is the rigid coherency between data and parity, which results from maintaining current parity information and causes small updates to experience large rotational latencies of the disks during the RMW sequence.

What is needed, therefore, is an architecture that relaxes the coherency between parity and data to reduce the access time necessary to update data stored on an array of disks.

SUMMARY OF THE INVENTION

There is provided a method and apparatus for effectuating a data update protocol on a fault-tolerant storage device having a plurality of disk-drive units forming a disk array, with parity-block updates temporarily suspended to provide with increased performance. Parity-block updates are typically deferred until the I/O rate of the disk array indicates that the disk array is idle, thereby relaxing the coherency between data and parity for short periods of time. This allows performing a small update without reading old data and old parity information stored on the array, which decreases the rotational latency of the drive units. With parity updating being deferred, the array does not always include redundant information. Rather, the array frequently includes redundant information. In this fashion, the update protocol of the present invention provides a Frequently Redundant Array of Independent Disks and is referred to as the AFRAID protocol.

The AFRAID protocol effectuates a small update by identifying the blocks in the array where data is to be written, i.e., target areas of a stripe. New data is then written directly to the target areas without reading the old data present therein. In addition to writing the new data, a "needs parity rebuild bit" (NPRB) is written to a non-volatile memory, which identifies the updated stripe as not having parity information corresponding to the new data, i.e. the stripe is unprotected. In one embodiment, the number of NPRBs present is monitored to allow continuously calculating a Mean-Time-To-Data-Loss (MTTDL). So long as the MTTDL remains within a predetermined range, parity updates are deferred until the array is idle. To that end, the I/O requests to the array are monitored to determine idleness. When the disk array is idle, one or more unprotected stripes are selected as needing parity information rebuilt. For each such stripe, all of the data of the stripe is read and XOR'd, producing new parity data. The new parity data is then written to the appropriate target area in the stripe. If the MTTDL requirement is not satisfied, the update proceeds in accordance with the conventional RMW update protocol.

In a second embodiment, the AFRAID protocol may be selectively employed based upon a number of criteria. For example, the default update protocol could be the AFRAID protocol with certain update requests "flagged" such that a conventional update protocol would be employed for these updates. In addition, subsets of the array's storage space, e.g. certain block addresses, could be "flagged" such that updates thereto would use the conventional RMW update protocol. Conversely, the default update process could be the conventional RMW update protocol and certain update operations and/or block addresses could be "flagged" so that the AFRAID protocol would be activated for them.

BEST MODE FOR CARRYING OUT THE INVENTION

Figure 1:
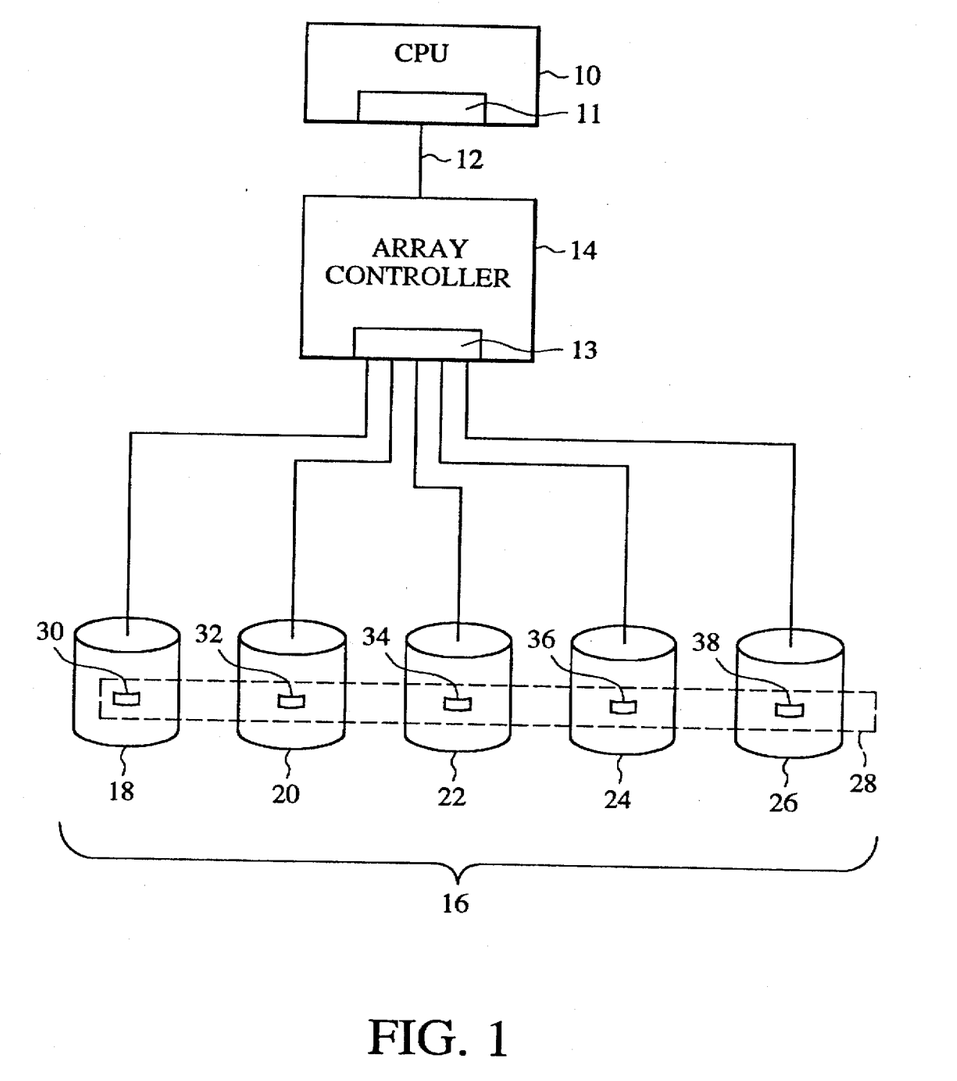
FIG. 1 is a simplified block diagram of a computer system incorporating a small data update protocol in accordance with the present invention.

FIG. 1 shows a computer system including a CPU 10 associated with a buffer memory 11. The CPU 10 is in electrical or optical communication with an array controller 14 via line 12. Controller 14 is associated with buffer memory 13. A non-volatile storage array 16 is formed from a plurality of storage units, such as disk-drives 18, 20, 22, 24 and 26. Although five disk-drives are shown, the array 16 may in fact comprise of as many disk-drives as desired, dependent upon the application. The array controller 14 is in either electrical or optical communication with each disk-drive of the array 16. The array controller 14 typically includes a separately programmable processor to control the disk-drives 18–26, independent of the CPU 10. The CPU 10 may support multiple users executing a wide variety of computer applications. During operation the CPU 10 issues I/O requests, such as READ and WRITE commands, to transfer data between memory 11 and the array 16 via controller 14.

In RAID 5 architecture the storage space of disk drives 18, 20, 22, 24 and 26 is organized into a set of sequentially numbered blocks on each disk drive. Typically, a block of data is equal to the same amount of information that may be stored on a conventional sector of a disk. However, blocks may be larger; for example, a block may equate to an integral number of sectors. The blocks are further organized into sections of data, known as a stripe. As discussed in the background section, a stripe consists of blocks of each disk having identical address ranges. Each stripe has N blocks of data, plus one parity block. The parity block contains parity information for the data recorded in the remaining blocks of the stripe. The parity blocks may be distributed across each of the disk drives. The striping technique allows concurrent reading and writing of data to several disks on several different disk drives.

A problem with RAID 5 architecture, and the prior art in general, is that parity protection of data requires a large number of I/O requests, for each small update. For example, assume data is presently stored in memory 11 that is intended for the target area that is block 36. Block 36 is included in a stripe 28 that comprises of blocks 30, 32, 34, 36 and 38. To write the new data to block 36, while maintaining parity protection, would require reading the old value of the data in that block. In addition, the old parity would have to be read. For example, the parity stored in block 38 which corresponds to the target area would have to be read. This information would be transferred to memory 13 where it would be subjected to an XOR operation with the new data stored therein. Thereafter, the new data would be written to block 36, with the new parity data being written to block 38. Thus, four I/O requests are needed to achieve small updates: two of which include a READ operation and two of which include a WRITE operation.

In order to reduce the number of I/O requests necessitated for a small update, the present invention takes advantage of the inherent reliability of modern disk drives, as well the observation that arrays rarely use the parity information present. To that end, the present invention allows performing a small update without reading old data and old parity information on the array. The data is written onto the array with no parity error correction information being present corresponding to the new data, for a short amount of time.

The inherent reliability of modern disk drives may be demonstrated by the availability of data on the disk drives. Availability is defined as an amount of time that data on a disk or array is accessible and/or not lost. The availability of most RAID architectures may be determined by examining the time to the first catastrophic data loss that results from disk failure. Because RAID 5 always provides parity/redundancy information, catastrophic data loss occurs when two disks fail close in time, i.e. before redundancy information has been rebuilt after a first disk failure. The measure for this type of data loss is the mean-time-to-first-data-loss (MTTDL) which, for a RAID 5 disk array with N+1 disks, may be shown as follows:

$$MTTDL_{RAID-catastrophic} = (MTTF_{disk})^2 / (N(N+1) \times MTTR_{disk}) \quad (1)$$

where $MTTF_{disk}$ is the disk mean-time-to-failure and MTTR is the mean-time-to-repair. A 5-disk array having an $MTTF_{disk}=1,000,000$ hours and an $MTTR_{disk}=48$ hours provides an $MTTDL_{RAID-catastrophic}$ of approximately 475,000 years. With this type of reliability, it was determined that deferring the parity update, for a short period of time, involves little risk of data loss, i.e., without greatly reducing availability. Typically, the parity updates are deferred until the array 16 is idle, in terms of access requests by the CPU 10. Deferring the parity update in this manner reduces the rotational latency perceived by requests from CPU 10, thereby increasing performance by providing a write "response" time comparable to that of a non-redundant array of disk drives.

By employing the AFRAID protocol, it was recognized that the availability of the array 16 had changed. Specifically, data loss can occur when a single disk fails unexpectedly, unlike RAID 5 which exhibits data loss only upon the failure of two disks close-in-time. With the presence of both unprotected and protected data on the array 16, the contribution to MTTDL for the period of unprotected data may be shown as follows:

$$MTTDL_{AFRAID-unprotected} = (T_{total}/T_{unprot.}) \times (MTTF_{disk}/(N+1)) \quad (2)$$

with $T_{unprot.}/T_{total}$ being the fraction of time there is unprotected data in the array 16, $MTTF_{disk}$ being the disk meantime-to-failure, and N+1 being the total number of disks in the array 16.

Without unprotected data present on the array, the MTTDL of the array equates to that determined by equation (1) and is shown as follows:

$$MTTDL_{AFRAID-RAID-catastrophic} = T_{total}/(T_{total}-T_{unprot.}) \times MTTDL_{RAID-catastrophic} \quad (3)$$

with $T_{unprot.}/T_{total}$ being as described above with respect to equation (2). Summing equations (2) and (3) provides the MTTDL for an array employing the AFRAID protocol as follows:

$$MTTDL_{AFRAID} = 1/(MTTDL_{AFRAID-unprotected} + 1/(MTTDL_{AFRAID-RAID-catastrophic})) \quad (4)$$

Based upon the foregoing, it is seen that the unprotected data in the array can reduce the MTTDL providing a less available array. By deferring parity updates until the I/O access is idle, it is recognized that the amount of unprotected data, at any given time, is determined by the burstiness of the program/application being operated on the CPU 10. Specifically, it is recognized that certain applications provide sufficient idle I/O time so that the availability of an AFRAID array approximates the availability of an array providing full redundancy, e.g., RAID 5, while the write throughput time is comparable to that of an array not having redundant information. Conversely, some programs/applications do not provide sufficient idle I/O time, which results in array having an availability of a disk array without protected data.

Taking advantage of the aforementioned concepts, the AFRAID protocol provides optimum performance while maintaining the availability level desired. This is achieved by continuously determining the MTTDL of an array while a program/application is running, which requires ascertaining the quantity of unprotected data in the array at any given time.

Figure 2:
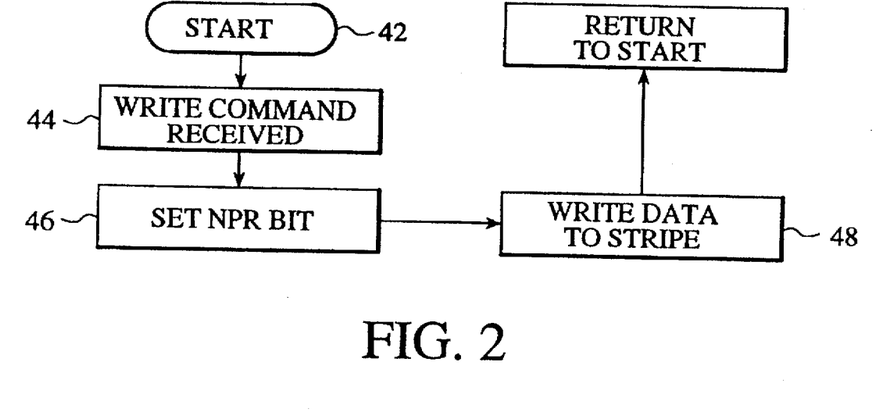
FIGS. 2, 3 and 4 are flow charts showing asynchronous subroutines of a first method for performing a small update protocol in accordance with the present invention.
Figure 3:
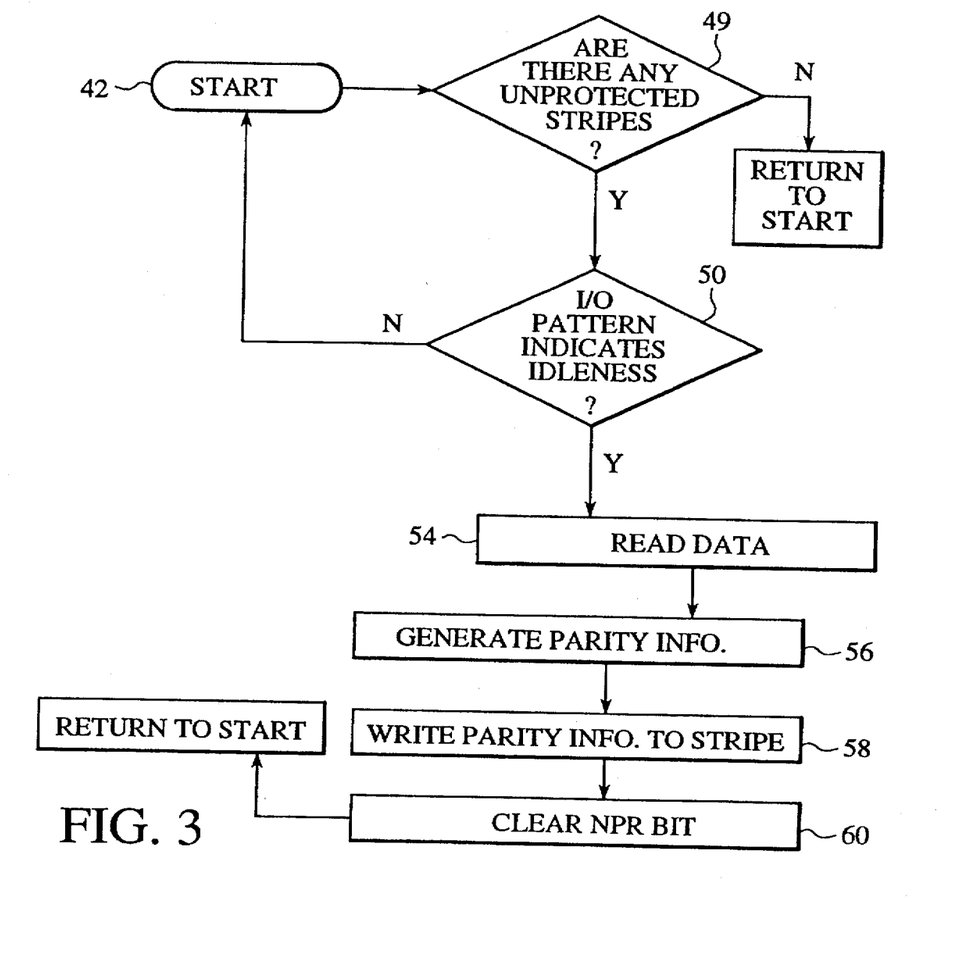
Figure 4:
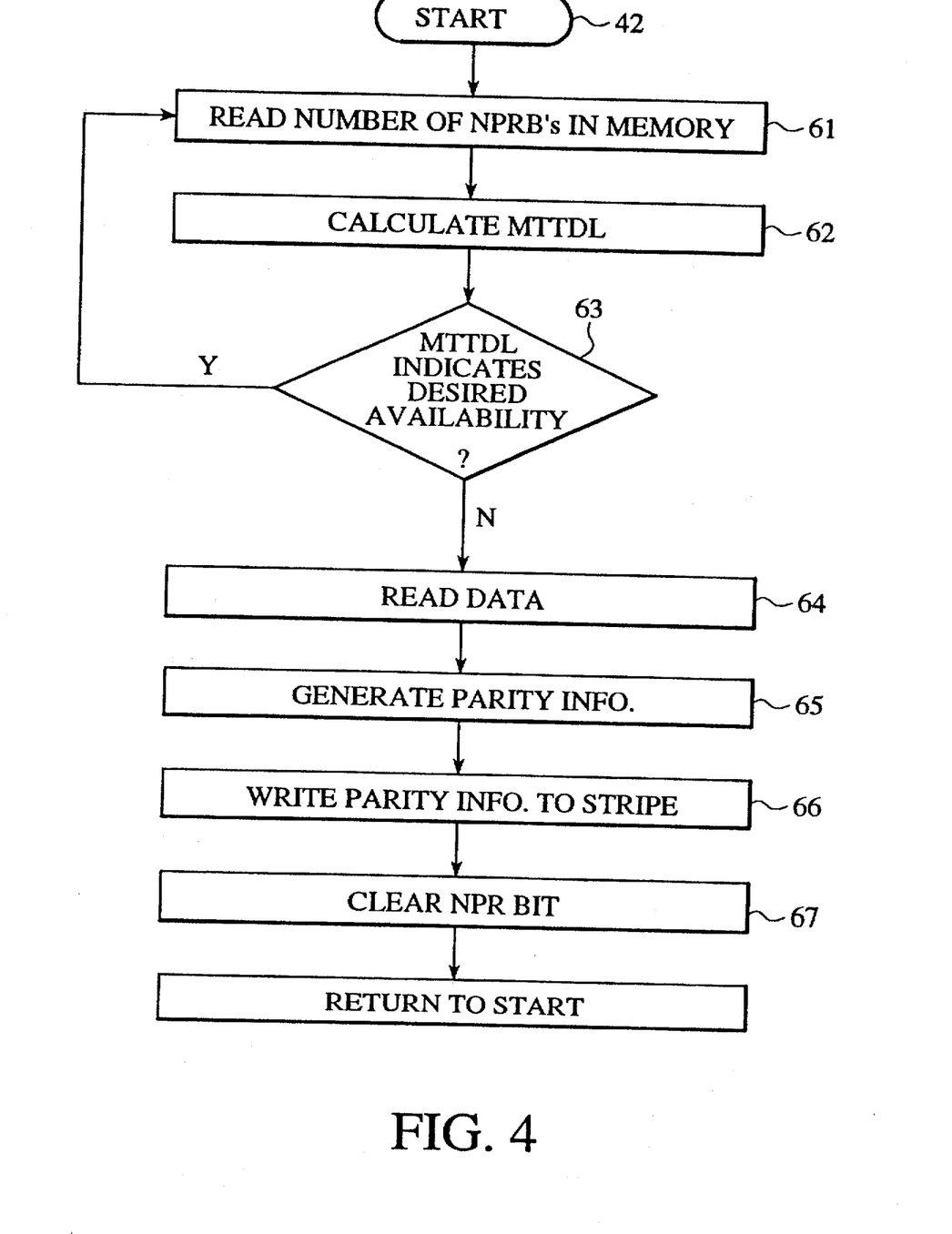

Referring also to FIGS. 2, 3 and 4, the AFRAID protocol is described as three asynchronous subroutines which are preferably implemented as a computer program executed by controller 14 to effectuate WRITE and READ operations to and from array 16. The AFRAID protocol is discussed with respect to WRITE operations to simplify the description. However, the following description applies by analogy to READ operations. The steps of the subroutine shown in FIG. 2 include controller 14 monitoring I/O requests from the CPU 10 on an essentially continuous basis at step 42. When an active process or application causes the CPU 10 to generate a Write command, the command is passed onto the controller 14. The controller 14 identifies the target areas on the disk drives, where the data will be written. The target areas are located in blocks on the disks of each disk drive that form a stripe of data of the array 16. At step 44, the Write command is received at controller 14. In step 46, one or more markers are recorded in memory 13 identifying the stripes on the disk drives that will receive data. In step 48, data is written to the array 16, creating an updated stripe. In this manner, any data present in the target areas is overwritten without being read. The marker in memory 13 signifies that the data in the updated stripe is unprotected, i.e. parity (error-correction) information is not present on the array 16 for the updated stripe. The marker is typically known as a "needs parity rebuild bit" (NPRB) and is preferably a bit of information written to non-volatile memory 13. To that end, memory 13 is typically a RAM with battery backup to forego information loss in the presence of a power failure, which allows continuously monitoring the amount of unprotected data on the disk drives of the array. Although step 48 is shown separate from step 46, both step 46 and 48 could occur simultaneously during the writing of the new data to the target areas.

FIG. 3 shows the second subroutine of the AFRAID protocol as including step 49, with controller 14 examining the NPRBs in memory 13 and determining whether there is any unprotected data on array 16. In step 50, the controller 14 determines whether the array may be considered sufficiently idle to generate and write parity information for the array 16. The idleness determination may be based upon any one of the methods known in the art, some of which are described by Richard Golding et al. in "Idleness is not sloth," *Proceedings of Winter USENIX 1995 Technical Conference*, Jan. 16–20, 1995, pages 201–212. For example, a disk drive may be considered idle if the controller 14 has not sensed any I/Os to or from the disk drive for a predetermined amount of time, e.g. 100 ms. In addition, a disk drive may be considered idle if the rate of I/Os sent to, or transmitted therefrom, has dropped below a predetermined rate/threshold, e.g., more than zero but less than some upper bound set by a user. If the controller determines that the array is not idle, the subroutine returns to start at step 42. If there have been additional I/O requests, e.g., a write request, the write command is processed as discussed above with respect to FIG. 2. If no new I/O requests are present, the controller 14 determines once again whether the array may be considered idle. At step 54, if the array 16 may be considered idle, the controller 14 reads the data in one or more of the unprotected stripes. At step 56, the parity information is then generated. The parity information generated is then written to the appropriate blocks of the unprotected stripe, at step 58. Thereafter, the NPRBs corresponding to the stripes whose parity have been updated is cleared from memory 13, at step 60, and the controller 14 continues to monitor the CPU 10 for another I/O request.

FIG. 4 shows the third subroutine of the AFRAID protocol including step 61 where controller 14 examines the number of NPRBs recorded in memory 13, as well as the duration of time in which there has been no change in said number. In step 62, the CPU 10 calculates the MTTDL based upon the number of NPRBs in memory 13, as well as the duration of time there has been no change in said number. In step 63, the subroutine determines whether the MTTDL calculated in step 62 satisfies the availability desired by a user. In this fashion, the availability of array 16 is calculated on a continuous basis to determine whether array 16 provides the availability of an array without protected data, an array providing continuous protection of data, or somewhere therebetween. For example, using RAID 5 architecture as a baseline, a user may set the AFRAID protocol so that the availability provided is 90% of that, of RAID 5 architecture. Typically, the availability provided by the protocol may be determined as a function of the presence of NPRBs in memory 13, so that each desired level of availability may correspond to the duration during which NPRBs are present in memory 13. If the duration during which the NPRBs are present in memory 13 exceeds a predetermined length of time, the MTTDL would be unacceptable and the protocol would proceed to steps 64-67, which are identical to steps 54, 56, 58 and 60, as shown in FIG. 3. If the duration during which the NPRBs present are in memory 13 was below a predetermined length of time, the protocol would return to step 61 to continuously monitor the availability of array 16. In addition, the availability may be based upon the number of NPRBs in memory 13. In lieu of recording bits in memory 13, any other data structure may be employed to indicate unprotected data. For example, the data in memory 13 may comprise a list of stripe numbers which have unprotected data.

It should be understood that parity updates for adjacent unprotected stripes of data may be performed concurrently, thereby requiring less disk time. This allows gaining greater time efficiency during the parity rebuild. It is clear that the number of unprotected stripes is a function of the length and periodicity of idleness. Therefore, the number of stripes that may become unprotected may be adjusted by altering the criteria for idleness.

Alternatively, a different availability measure for the array may be determined from the average time in which there has been no change in the number of NPRBs stored in memory 13. This allows determination of the average amount of unprotected data on the array for a given period of time, referred to as the mean-parity-lag. This can be determined from the number of NPRBs set, and the length of time for which they have been set. From the measurement of the mean-parity-lag, it is possible to determine the mean-data-loss-rate (MDLR), which is proportional to the amount of data subject to loss at any given time and the fraction of time that the data is unprotected. As discussed above, catastrophic data loss for the RAID 5 architecture occurs upon two disks failing close in time. Thus, the MDLR for the RAID 5 architecture may be shown as follows:

$$MDLR_{RAID-catastrophic}=2V_{disk} \times N/(N+1) \times 1/MTTDL_{RAID-catastrophic} \quad (5)$$

where $V_{disk}$ is the capacity of a single disk and N+1 is the number of disks in the array. As discussed above, the AFRAID protocol experiences catastrophic failure upon one disk failing, and this provides an MDLR as follows:

$$MDLR_{unprotected}=(\text{mean parity lag}/N) \times (N+1)/MTTF_{disk} \quad (6)$$

where the term (mean parity lag/N) defines the average amount of unprotected data vulnerable to a single disk failure and the term ((N+1)/MTTF) defines the total failure rate of all the disks in the array. Summing (5) and (6) together provides the MDLR for the AFRAID protocol as follows:

$$MDLR_{AFRAID}=MDLR_{RAID-catastrophic}+MDLR_{unprotected} \quad (7)$$

Employing an MDLR calculation, the AFRAID protocol allows a user to base reliability on not only the mean-time-to-data-loss (MTTDL), but also on the amount of data subject to loss (MDLR). As with the MTTDL, the MDLR may be calculated continuously while the AFRAID protocol is employed either to operate in conjunction with the MTTDL or in lieu thereof. If the MDLR calculation is employed in conjunction with the MTTDL calculation, the number of bits measured at step 61 would indicate two criteria that must be satisfied at step 63 before the protocol would proceed with step 64. It was determined, however, that the MTTDL was the controlling variable with respect to reliability degradation of the array, because the AFRAID protocol did not increase the MDLR to the extent that the protocol decreased the MTTDL. Thus, to simplify the calculations, it is preferred to forego calculations of MDLR.

Figure 5:
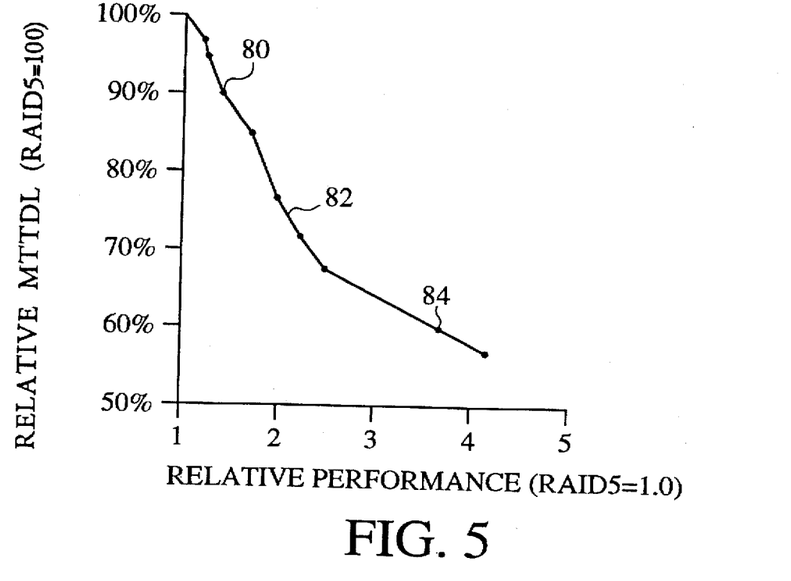
FIG. 5 is a graph comparing the performance and reliability of the present invention with RAID 5 architecture.

Referring also to FIG. 5, the comparison between a RAID system operating with the RAID 5 architecture and the AFRAID protocol is demonstrated. The data shown was obtained by using an event-driven simulator, which simulated the operation of an array with a plurality of traces. The traces corresponding to I/O access between different processing systems and an array of disk drives. The simulator modelled an array comprising HP C3325, 2GB, 3.5", 5400 RPM disks. Graph 82 represents the geometric mean of the results obtained from all of the traces analyzed. The ordinate shows the relative reliability of the AFRAID protocol compared to the RAID 5 architecture. The abscissa shows the relative write response time compared to that of the RAID 5 response time. At point 80, the AFRAID protocol provides approximately 90% of the reliability of the RAID 5 architecture with approximately 1.5 times improved response time. Point 84 shows the AFRAID protocol providing approximately 60% of the reliability of the RAID 5 architecture with 3.5 times better response time. FIG. 5 shows the trade-off between performance and availability. In the preferred embodiment, a user would set the desired reliability, e.g. 50%, 70% or 90% of RAID 5, and the AFRAID protocol would continuously calculate the MTTDL. So long as the MTTDL was within set criteria, the AFRAID protocol would defer parity updates until the array 16 was considered idle. Otherwise, the AFRAID protocol would immediately read the data contained in one or more unprotected stripes and write parity information. Any conventional technique may be employed to achieve parity rebuild of unprotected stripes, including piggy-backing the parity updates or doing a single sweep through the disk.

Figure 6:
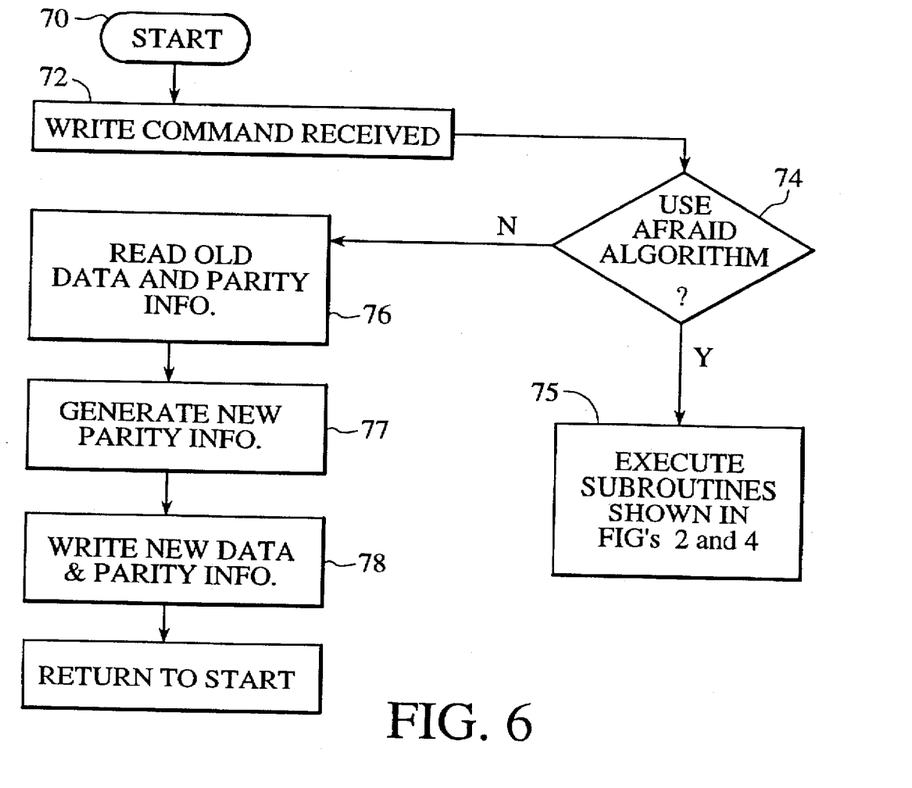
FIG. 6 is a flow chart of a second method for performing a small update protocol in accordance with the present invention.

Referring also to FIG. 6, periodic implementation of the AFRAID protocol is shown with the controller 14 monitoring the I/O requests from the CPU 10 on an essentially continuous basis at step 70. After array 16 receives a WRITE command at step 72, the controller 14 must then determine, at step 74, whether a conventional RMW update protocol is to be activated, steps 76, 77, and 78, or whether the AFRAID protocol is to be activated. If the AFRAID protocol is employed, the program proceeds to step 75 and the subroutines shown in FIGS. 2 and 4 are executed, as described above. In this manner, a user could choose whether the AFRAID protocol will be employed for small-updates.

In the conventional update protocol, the old value of the data is read 76 from the target areas on the disk, identified by the controller 14, as the areas where new data will be written, as is the old parity information corresponding to those target areas. This old data and parity information is transferred to memory 13 where it would be subjected to an XOR operation with the new data stored therein to generate new parity information at step 77. Thereafter, at step 78, the new data and parity information are written to the appropriate target areas on the array 16.

The determination of which of the two update protocols should be employed, in step 74, could be based upon the occurrence of any one of a plurality of conditions. For example, the default update process could employ the AFRAID protocol with certain writes "flagged" such that the conventional update protocol would be employed for these requests. In addition, subsets of the array's storage space, e.g. certain block or stripe addresses, could be "flagged" such that data written thereto would be written using the conventional update protocol. Conversely, the default update process could be the conventional update protocol and certain operations could be "flagged" to the AFRAID protocol. Moreover, the AFRAID protocol may automatically be activated whenever the CPU 10 predicted that the I/O pattern would allow increased throughput time while maintaining a target MTTDL. Any of the well known prediction techniques that monitor past I/O functions may be employed to make such predictions.

While the invention has been discussed with respect to small-file-writes, i.e. partial-stripe-updates, it is equally applicable to large stripe updates, wherein new data is written to a substantial number of the blocks that comprises the stripe, if not the entire stripe. If a full stripe is being written, there is little or no benefit in using the AFRAID protocol; so, such stripes should simply be written in their entirety, including new parity with the associated NPRB being cleared.

The AFRAID protocol may also be implemented for updating substripes of a stripe of data. In this fashion, new data is written to a portion of some blocks comprising a stripe. For example, if each block contained 64 kilobytes of information, the updated substripe could comprise of only 2 kilobytes of data written to each block, or subset of blocks, in any given stripe. In this example, only 2 kilobytes of new parity information would need to be generated and written to the parity block of the stripe.

What is claimed is:

1. A method for storing data in a fault-tolerant storage device having a plurality of disk units forming a disk array with a plurality of stripes for storing data and parity information, comprising the steps of:

identifying at least one target area on said array to write new data, with said at least one target area including old data and being associated with one of said plurality of stripes, defining an updated stripe;

in the absence of a reading step, writing new data to said at least one target area, said new data not having corresponding parity information defining unprotected data;

monitoring a quantity of said unprotected data present on said array to detect presence of a preselected condition related to susceptibility of said at least one target area to loss of said unprotected data; and in response to said step of monitoring said quantity of said unprotected data and prior to completion of writing all of said new data at said at least one target area, dynamically adjusting said quantity of unprotected data present on said array by generating and writing parity information corresponding to a first portion of said new data to said disk array, while leaving a second portion of said new data as unprotected data.

2. The method as recited in claim 1 wherein said adjusting step adjusts said quantity of unprotected data to ensure said quantity does not exceed a predetermined threshold.

3. The method as recited in claim 1 wherein said monitoring step includes continuously determining a mean-time-to-data-loss.

4. The method as recited in claim 1 wherein said monitoring step includes monitoring said quantity over a predetermined amount of time, to determine an average amount of unprotected data during said period, determining a mean-data-loss-rate.

5. The method as recited in claim 1 wherein said adjusting step includes generating said parity information associated with said new data and writing said parity information to said updated stripe.

6. The method as recited in claim 5 further including the steps of (a) monitoring the rate of I/O requests to the array and (b) generating a parity block associated with said new data upon detection that said rate of I/O requests is within a predetermined range.

7. The method as recited in claim 6 wherein said identifying step and said writing new data step occur a plurality of times, thereby updating a plurality of stripes with new data before said generating said parity block step occurs, with said generating step concurrently producing parity information for said plurality of stripes containing new data.

8. The method as recited in claim 5 further including the step of writing, to memory, information indicating that parity information, corresponding to said new data, is not present on said disk array with said information defining a need-parity-rebuild bit (NPRB), said monitoring step sensing said NPRB and said adjusting step producing said parity information in response to the presence of said NPRB bit.

9. A method for storing data in a fault-tolerant storage device having a plurality of disk drive units forming a disk array with a plurality of stripes for storing data and parity information, comprising the steps of:

monitoring the I/O patterns to and from the disk drive units of the array to determine the idleness of the disk array;

identifying multiple target areas on each disk of said array to write new data, with at least one of said multiple target areas including old data, with said multiple target areas being associated with one of said plurality of stripes, defining a target stripe;

in the absence of a reading step, writing new data to a plurality of said multiple target areas, wherein new data not having corresponding parity information stored on said array defines unprotected data;

monitoring a quantity of unprotected data present on said array to detect when said quantity exceeds a preselected threshold; and in response to said monitoring of said quantity of unprotected data, dynamically adjusting the quantity of unprotected data by generating and writing to said target stripe parity information corresponding to said unprotected data to at least one of said multiple target areas such that said quantity is maintained at a level below said preselected threshold.

10. The method as recited in claim 9 further including the step of writing to memory, information indicating that parity information, corresponding to said new data, is not present on said array with said information defining a needs parity rebuild bit (NPRB), said generating step producing parity information in response to the presence of said NPRB.

11. The method as recited in claim 9 wherein said generating and writing step generates and writes parity information to ensure said quantity is within a predetermined range.

12. The method as recited in claim 9 wherein said monitoring step includes continuously determining a mean-time-to-data-loss and said generating and writing step generates and writes parity information to ensure said mean-time-to-data-loss is within a predetermined range.

13. The method as recited in claim 9 wherein said monitoring step includes monitoring said quantity over a predetermined amount of time, to determine an average amount of unprotected data during said period, determining a mean-data-loss-rate, and said generating and writing step includes generating and writing parity information to ensure mean-data-loss-rate is within a predetermined range.

14. The method as recited in claim 9 wherein said identifying and writing steps occur a plurality of times, writing a plurality of data stripes to said array before said generating step occurs, with said generating and writing step concurrently producing parity information for said plurality of data stripes and concurrently writing said parity information to said array.

15. An apparatus for generating parity information for a plurality of disk drives, comprising:

a plurality of individual disk drives defining an array of disks having a plurality of stripes, each of said plurality of stripes having multiple target areas in which data may be written, with at least one of said multiple target areas including old data, defining an old data target area;

a controller means, in data communication with said array, for coordinating the operation of said array;

means, in data communication with both said controller means and said array, for writing new data onto a first plurality of said multiple target areas, including said old data target area, defining new data target areas;

means, in data communication with said controller means, for generating parity information from said new data present in said new data target areas, whereby new data not having corresponding parity information written on said array defines unprotected data;

means, in data communication with both said controller means and said array, for monitoring a quantity of unprotected data present on said array to detect presence of a preselected condition relating to susceptibility of said new data target areas to loss of said new data;

means, in data communication with both controller means and said array and responsive to said monitoring means, for dynamically adjusting said quantity of unprotected data on said array by generating and writing parity information corresponding to a first portion of said new data to said array, while leaving a second portion of said new data as unprotected data.

16. The apparatus as recited in claim 15 wherein said adjusting means adjusts said quantity of unprotected data to ensure said quantity is within a predetermined range.

17. The apparatus as recited in claim 15 wherein said monitoring means continuously determines a mean-time-to-data-loss and said adjusting means adjusts said quantity of unprotected data to ensure said mean-time-to-data-loss is within a predetermined range.

18. The apparatus as recited in claim 15 wherein said monitoring means monitors said quantity over a predetermined amount of time, to determine an average amount of unprotected data during said period, and determines a mean-data-loss-rate, and said adjusting means adjusts said quantity to ensure mean-data-loss-rate is within said predetermined range.

* * * * *